(12) United States Patent
Shimura

(10) Patent No.: US 8,761,631 B2
(45) Date of Patent: Jun. 24, 2014

(54) POWER SUPPLY INCLUDING ZERO-CROSS DETECTION CIRCUIT, AND IMAGE FORMING APPARATUS

(71) Applicant: Canon Kabushiki Kaisha, Tokyo (JP)

(72) Inventor: Yasuhiro Shimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 13/710,208

(22) Filed: Dec. 10, 2012

(65) Prior Publication Data

US 2013/0148998 A1 Jun. 13, 2013

(30) Foreign Application Priority Data

Dec. 12, 2011 (JP) ................................. 2011-271681

(51) Int. Cl.
*G03G 15/00* (2006.01)
*G03G 15/20* (2006.01)

(52) U.S. Cl.
USPC ................................. 399/88; 399/67; 399/70

(58) Field of Classification Search
USPC .................................. 399/67, 88, 90; 307/326
See application file for complete search history.

(56) References Cited

U.S. PATENT DOCUMENTS

2012/0112564 A1* 5/2012 Wu et al. ........................ 307/326

FOREIGN PATENT DOCUMENTS

| JP | 2001-306160 | * 11/2001 |
| JP | 2003-199343 A | 7/2003 |

* cited by examiner

*Primary Examiner* — Hoang Ngo
(74) *Attorney, Agent, or Firm* — Canon U.S.A., Inc., IP Division

(57) ABSTRACT

A power supply includes a first capacitor, a resistor for discharging an electric charge of the first capacitor and for detecting zero crossing of the AC voltage input from the AC power supply, a second capacitor, and a frame ground o and a discharge resistor having a resistance value smaller than the resistor and configured to discharge an electric charge of the second capacitor, and switches between a state where a current to the discharge resistor is cut off and a state where a current flows through the discharge resistor.

10 Claims, 14 Drawing Sheets

POWER SUPPLY INCLUDING ZERO-CROSS DETECTION CIRCUIT, AND IMAGE FORMING APPARATUS

BACKGROUND OF THE INVENTION

1. Field of the Invention

The present invention relates to a power supply into which a zero-cross detection circuit usable for controlling an electronic apparatus is loaded.

2. Description of the Related Art

As an example of a fixing apparatus that is loaded into an image forming apparatus such as a copying machine or a printer, an apparatus including an endless belt (or an endless film) and a ceramic heater that contacts an inner surface of the endless belt, and a pressure roller that forms a fixing nip portion together with a ceramic heater across the endless belt. As a control method for supplying electric power to the fixing apparatus, phase control of electric power supplied from an alternating current (AC) power supply to the ceramic heater can be performed using a switch element such as a thyristor (triac). In order to perform phase control of electric power supplied from the AC power supply, timing at which an AC voltage becomes 0 V (this timing is hereinafter referred to as a zero crossing) needs to be accurately detected as the basis for the phase control.

In recent years, power consumption (also referred to as standby electricity) in a state where the image forming apparatus does not perform an image forming operation (hereinafter also referred to as a sleep state) should be further reduced. To further reduce the power consumption in the sleep state, electric power consumed by a zero-cross detection circuit needs to be reduced. This is because the supply of electric power to the zero-cross detection circuit is continued even in a state where the image forming apparatus does not operate. Therefore, to prevent the zero-cross detection circuit from consuming electric power in the sleep state, a circuit for cutting off a current for detecting the zero crossing needs to be provided.

Japanese Patent Application Laid-Open No. 2003-199343 discusses a power supply circuit including a zero-cross detection circuit and a capacitor (hereinafter referred to as a Y capacitor) serving as a capacitive component between a potential obtained by full-wave rectifying an AC voltage from an AC power supply, and a frame ground (hereinafter referred to as FG). In the power supply circuit, a resistor for discharging the Y capacitor (hereinafter referred to as a Y capacitor discharge resistor) is required to accurately detect a zero crossing. If the conventional zero-cross detection circuit is used, therefore, a current flowing through the zero-cross detection circuit and the Y capacitor discharge resistor needs to be cut off to reduce the power consumption in the sleep state of the image forming apparatus. Thus, a plurality of cutoff circuits needs to be provided. If the cutoff circuits are provided, a circuit cost and a circuit scale are increased.

On the other hand, the power supply circuit may include a capacitor serving as a capacitive component (hereinafter referred to as an X capacitor) provided between lines to which electric power is supplied from an AC power supply. The X capacitor is generally provided as a measure against noise. When a user pulls out a power supply cable that supplies electric power to a power supply circuit, the X capacitor may be electrically charged by the AC power supply. When the user pulls out the power supply cable, the user may contact a terminal of an outlet. Therefore, a discharge resistor for discharging the electric charge of the X capacitor (hereinafter referred to as an X capacitor discharge resistor) is required.

Therefore, in the power supply circuit, a state of the power consumption is required to be switchable to further reduce the consumption in a simple configuration in the sleep state and a state where the zero crossing of the AC voltage is detected.

SUMMARY OF THE INVENTION

According to an aspect of the present invention, a power supply includes a first capacitor provided between lines to which an AC voltage is input from an AC power supply, a zero-cross detection resistor for discharging an electric charge of the first capacitor and for detecting zero crossing of the AC voltage input from the AC power supply, a zero-cross detection unit configured to detect the timing of the zero crossing of the AC voltage input from the AC power supply based on a detection signal from the zero-cross detection resistor, a second capacitor provided between a line to which a voltage obtained by full-wave rectifying the AC voltage that is input from the AC power supply is output, and a frame ground of an image forming apparatus, a discharge resistor having a resistance value smaller than the zero-cross detection resistor and configured to discharge an electric charge of the second capacitor, and a first switch configured to switch between a first state where a current to the discharge resistor is cut off and a second state where a current flows through the discharge resistor.

According to another aspect of the present invention, an image forming apparatus configured to form an image on a recording material and including a fixing unit configured to fix an image formed on the recording material includes a power supply including a first capacitor provided between lines to which an AC voltage is input from an AC power supply, a zero-cross detection resistor for discharging an electric charge of the first capacitor and for detecting zero crossing of the AC voltage input from the AC power supply, a zero-cross detection unit configured to detect the timing of the zero crossing of the AC voltage input from the AC power supply based on a detection signal from the zero-cross detection resistor, a second capacitor provided between the line to which a voltage obtained by full-wave rectifying the AC voltage that is input from the AC power supply is output, and a frame ground of the image forming apparatus, a discharge resistor having a resistance value smaller than the zero-cross detection resistor and configured to discharge an electric charge of the second capacitor, and a first switch configured to switch between a first state where a current to the discharge resistor is cut off and a second state where a current flows through the discharge resistor, an electric power supply switch for supplying electric power to the fixing unit, and an electric power control unit configured to control an electric power supplied to the fixing unit by controlling an operation of the electric power supply switch, in which the electric power control unit controls an operation of the electric power supply switch according to a detection result of the zero-cross detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

<Example of Applicable Apparatus>

Figure 1:
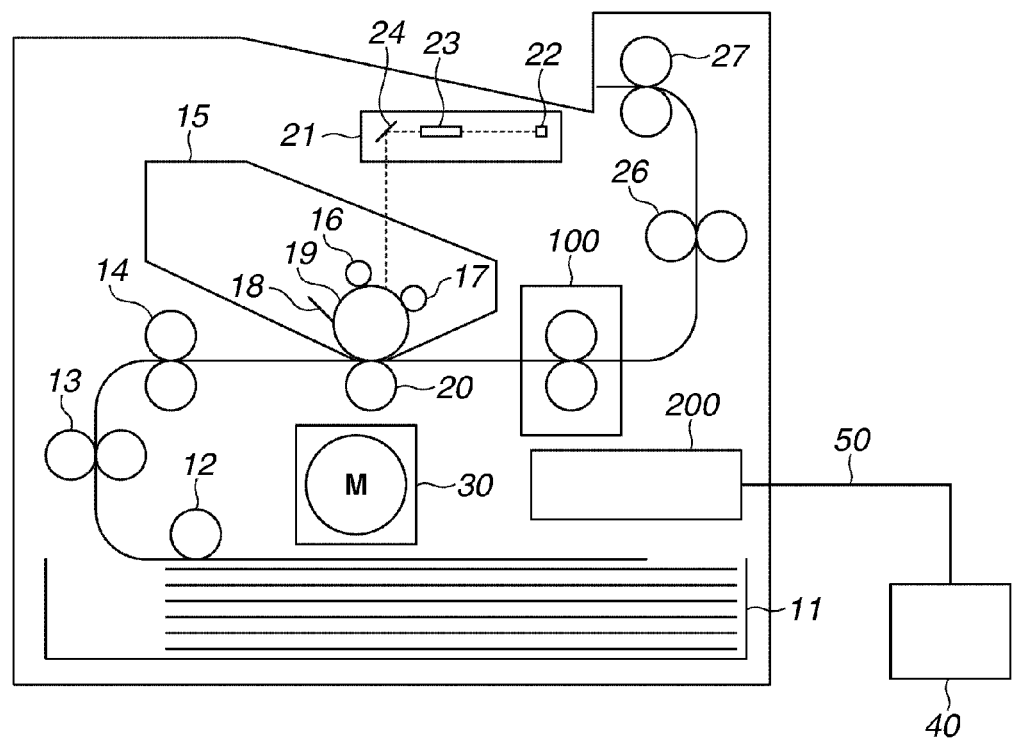
FIG. 1 is a schematic view of an image forming apparatus according to the present invention.

FIG. 1 illustrates an example of an image forming apparatus (a cross section) using an electrophotographic as an example of an apparatus to which a power supply, described below, is applicable. Recording materials, which have been loaded into a sheet cassette 11, are sent out of the sheet cassette 11 one at a time by a pickup roller 12, and are conveyed toward a conveyance roller 14 by a feeding roller 13. Further, the recording materials are conveyed to a transfer position (a process cartridge 15) on which an image is transferred at predetermined timing by the conveyance roller 14.

The process cartridge 15 includes a charging roller 16 serving as a charging unit, a development roller 17 serving as a development unit, a cleaner 18 serving as a cleaning unit, and a photosensitive drum 19 serving as an electrophotographic photosensitive member, which are integrally and detachably attached. The image is transferred onto the recording materials at the transfer position formed by the photosensitive drum 19 and a transfer roller 20.

A toner image is transferred onto the recording materials by a series of a known electrophotographic processes. The photosensitive drum 19 is subjected to image exposure based on an image signal generated by a scanner unit 21 serving as an image exposure unit after its surface is uniformly charged by the charging roller 16. Thus, an electrostatic latent image is formed on the photosensitive drum 19.

Scanning is carried out with a laser beam emitted from a laser diode 22 in the scanner unit 21 in a main scanning direction of the photosensitive drum 19 (a direction substantially perpendicular to a rotational direction of the photosensitive drum 19) via a polygonal mirror 23 and a reflection mirror 24 that rotate. The scanning is also carried out in a sub-scanning direction (the rotational direction of the photosensitive drum 19) by rotation of the photosensitive drum 19 so that an electrostatic latent image is formed on a surface of the photosensitive drum 19.

The development roller 17 visualizes the electrostatic latent image on the photosensitive drum 19 as a toner image. A transfer roller 20 transfers the toner image onto the recording material that has been conveyed from the conveyance roller 14 (registration). The recording material, on which the toner image has been transferred, is subjected to heating and press processing when conveyed to a fixing apparatus 100 so that an unfixed toner image is fixed on the recording material.

The recording material is discharged out of the image forming apparatus by an intermediate discharge roller 26 and a discharge roller 27 after the image has been fixed to end a series of printing operations. A motor 30 gives a driving force to each of the units including the fixing apparatus 100.

The fixing apparatus 100 controls electric power supplied to the fixing apparatus 100 from an AC power supply by turning on and off a semiconductor switch such as a thyristor (a triac) based on the timing of a zero crossing of an input AC voltage described below. In this control, a central processing unit (CPU) 203 described below, operates as a power control unit.

A power supply circuit 200 is used in the image forming apparatus. The AC power supplied from an external power supply unit 40 such as a commercial power supply is connected to the power supply circuit 200 via a power supply cable 50. The power supply circuit 200 supplies electric power to a motor serving as a driving unit and a controller such as a control unit in the image forming apparatus.

A product, to which the power supply circuit 200 described below, is applied is not limited to the above-mentioned image forming apparatus. The power supply circuit 200 is also applicable to other electronic apparatuses if the apparatus controls an operation using a zero crossing detection result.

Figure 2:
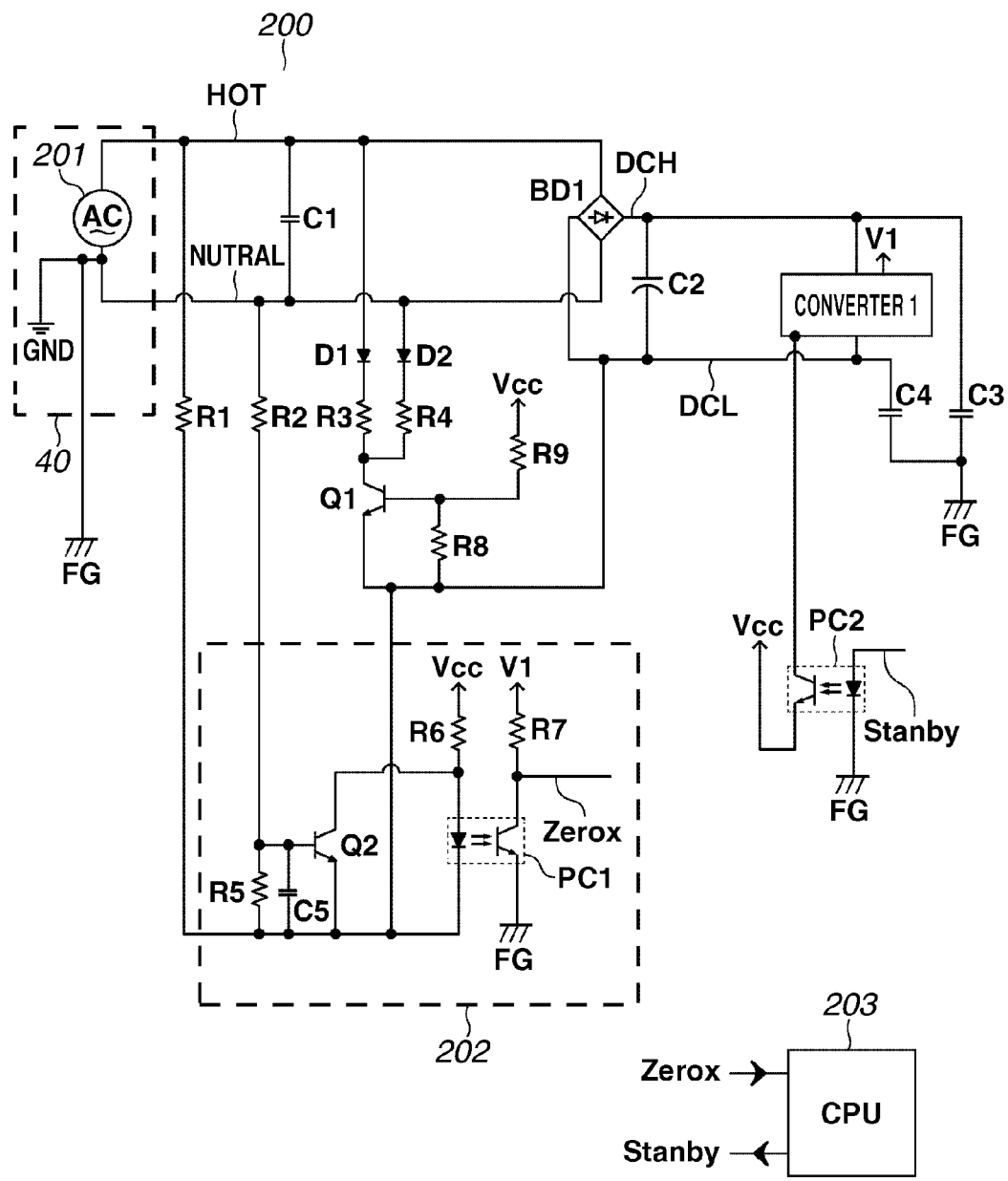
FIG. 2 illustrates a power supply circuit including a zero-cross detection circuit according to a first exemplary embodiment.

FIG. 2 illustrates the power supply circuit 200 including the zero-cross detection circuit according to the present exemplary embodiment. The external power supply unit 40 includes a ground GND serving as a ground point connected to a ground potential, and an AC power supply 201. The AC power supply 201 outputs an AC voltage between a LIVE line and a NEUTRAL line. In the present exemplary embodiment, the NEUTRAL line is connected to the ground GND in the external power supply unit 40. An effect of the present exemplary embodiment is effective even when the LIVE line is connected to the ground GND.

Further, even when a frame ground of the image forming apparatus is not connected to the ground GND, zero crossing detection accuracy described below, can be satisfied. In the present exemplary embodiment, the external power supply unit 40 and the power supply circuit 200 are connected to each other via three lines, i.e., the LIVE line, the NEUTRAL line, and the ground GND. The frame ground of the image forming apparatus is connected to the ground GND.

The AC voltage supplied from the AC power supply 201 is full-wave rectified by a bridge diode BD1, and is smoothed by a capacitor C2. A lower smoothed potential is DCL and a higher smoothed potential is DCH. A converter 1 is an insulation type DC/DC converter, and outputs a direct current (DC) voltage V1 toward the secondary side from a DC voltage on the primary side.

A first capacitor (hereinafter referred to as an X capacitor) C1 is used for noise suppression, and second capacitors (hereinafter referred to as Y capacitors) C3 and C4 are used as a measure against noise. Even if the Y capacitor C3 does not exist (i.e., if only the Y capacitor C4 exists), an effect of a Y capacitor discharge resistor, which will be described in the present exemplary embodiment, can also be obtained. Similarly, even if the Y capacitor C4 does not exist (i.e., if only the Y capacitor C3 exists), an effect of a Y capacitor discharge resistor, which will be described in the present exemplary embodiment, can also be obtained.

X capacitor discharge resistors R1 and R2 serve as a first discharge resistor for discharging the X capacitor C1 (the X capacitor discharge resistor R2 is also used as a zero-cross detection resistor). If a user pulls out the power supply cable 50 from the external power supply unit 40, the three lines, i.e., the LIVE line, the NEUTRAL line, and the ground GND between the external power supply unit 40 and the power supply circuit 200 are cut off. In this case, the X capacitor C1 may be electrically charged. Therefore, the user may get a shock when contacting a terminal of the power supply cable 50. To prevent this, the electric charge of the X capacitor C1 needs to be early discharged.

If the charging state of the X capacitor C1 is positive (a potential on the side of the LIVE line is higher than that on the side of the NEUTRAL line), the electric charge of the X capacitor C1 is discharged via the X capacitor discharge resistor R1 and the bridge diode BD1. If a charging state of the X capacitor C1 is negative (a potential on the side of the LIVE line is lower than that on the side of the NEUTRAL line), the electric charge of the X capacitor C1 is discharged via the X capacitor discharge resistor R2 and the bridge diode BD1. Y capacitor discharge resistors R3 and R4 serve as second discharge resistors for discharging the Y capacitors C3 and C4 respectively.

Diodes D1 and D2 are used for backflow prevention. An effect of the Y capacitor discharge resistor will be described below in FIG. 3. A high-voltage transistor (a first switch in the present exemplary embodiment) Q1 is used to cut off a current flowing through the Y capacitor discharge resistor. While a high-voltage bipolar transistor is used as the transistor Q1 in the present exemplary embodiment, another switch element such as a field effect transistor (FET) can also be used. A resistor R9 is a pull-up resistor for driving the transistor Q1, and a resistor R8 is a resistor for protecting the transistor Q1.

The X capacitor discharge resistors R1 and R2 are defined as a resistive element functioning to discharge an electric charge of the X capacitor C1 when the user pulls out the power supply cable 50. The resistors R1 and R2 are X capacitor discharge resistors, as described above. The resistors R3 and R4 may not function as a resistor for discharging the X capacitor C1 when the transistor Q1 is turned off. Therefore, the resistors R3 and R4 do not function as X capacitor discharge resistors, which are used to prevent the user from getting a shock.

The X capacitor discharge resistors R1 and R2 also have functions of discharging electric charges of the Y capacitors C3 and C4 respectively. However, resistance values of the X capacitor discharge resistors R1 and R2 are not low enough relative to the capacitances of the Y capacitors C3 and C4. Therefore, zero crossing detection accuracy decreases due to a delay effect of time constant (CR), described below in FIG. 3. The Y capacitor discharge resistors R3 and R4 have resistance values lower than at least the X capacitor discharge resistor R2 which supplies a current to a zero-cross detection circuit 202, of the X capacitor discharge resistors R1 and R2.

In a configuration in the first exemplary embodiment, the resistor R2 functions as both a zero-cross detection resistor and an X capacitor discharge resistor, and has the following resistance value:

Resistance value of X capacitor discharge resistor (zero-cross detection resistor) R2>resistance value of Y capacitor discharge resistor R3

Resistance value of X capacitor discharge resistor (zero-cross detection resistor) R2>resistance value of Y capacitor discharge resistor R4

The CPU 203 is used to control operations of the power supply circuit 200 and the image forming apparatus illustrated in FIG. 1. Details of the control performed by the CPU 203 will be described with reference to a flowchart illustrated in FIG. 4 described below.

In FIG. 2, a voltage Vcc is supplied from an auxiliary winding (not illustrated) of the converter 1. The voltage Vcc from the auxiliary winding is supplied via a transistor on the primary side of a photocoupler PC1. If the supply capability of the transistor on the primary side of the photocoupler PC1 is insufficient, the voltage Vcc from the auxiliary winding may be output using a transistor for output enhancement.

When a Stanby signal output from the CPU 203 enters a High state, the voltage Vcc is output so that electric power is supplied. Therefore, the voltage Vcc from the auxiliary winding enters a High state (a state where the voltage is output). When the Stanby signal output from the CPU 203 enters a Low state, the voltage Vcc (electric power) is not supplied. Therefore, the voltage Vcc enters a Low state (a state at the same potential as the reference potential DCL). With the voltage Vcc from the auxiliary winding, electric power for driving the zero-cross detection circuit 202 described below, and the transistor Q1 (the first switch) is supplied.

The zero-cross detection circuit 202 will be described. If a potential of the NEUTRAL line, which is supplied from the AC power supply 201, is higher than a potential of the LIVE line, a current flows through the zero-cross detection circuit 202 via the X capacitor discharge resistor R2. When the current supplied from the X capacitor discharge resistor R2 flows through a base terminal of a transistor Q2 in the zero-cross detection circuit 202, the transistor Q2 is turned on.

A resistor R5 and a capacitor C5 are circuits for adjusting the operation timing of the transistor Q2. When the transistor Q2 is turned on, a voltage applied to a diode on the primary side of the photocoupler PC1 falls so that a transistor on the secondary side of the photocoupler PC1 is turned off. When the transistor on the secondary side of the photocoupler PC1 is turned off, a voltage of a zero-cross (Zerox) signal rises via the pull-up resistor R7 by the output V1 of the converter 1. The CPU 203 detects a High state of the Zerox signal.

If the potential of the NEUTRAL line is lower than the potential of the LIVE line, a current flows via the X capacitor discharge register R1, and a current does not flow via the X capacitor discharge resistor R2, so that the transistor Q2 is turned off. When the transistor Q2 is turned off, a current flows from the voltage Vcc of the auxiliary winding to the diode on the primary side of the photocoupler PC1 via the pull-up resistor R6. Therefore, the transistor on the secondary side of the photocoupler PC1 is turned on. When the transistor on the secondary side of the photocoupler PC1 is turned on, the voltage of the Zerox signal falls. The CPU 203 detects a Low state of the Zerox signal. A waveform of the Zerox signal will be described with reference to FIG. 3.

A circuit operation in a power saving state (a first state also referred to as an energy saving state) where power consumption is further reduced when the image forming apparatus does not operate (hereinafter referred to as a sleep mode) will be described. Since the Stanby signal is in a Low state in the power saving state, the voltage Vcc from the auxiliary winding enters a Low state. Since the voltage Vcc is in a Low state, no current flows through a resistor R6, the diode on the primary side of the photocoupler PC1, and the collector terminal of the transistor Q2 in the zero-cross detection circuit 202 so that the power consumption can be reduced.

Since the voltage Vcc from the auxiliary winding is in a Low state, the high-voltage transistor Q1 is turned off. Therefore, a current flowing from the LIVE line via the resistor R3 and a current flowing from the NEUTRAL line via the resistor R4 are cut off, so that the power consumption can be reduced. The transistor on the secondary side of the photocoupler PC1 is always turned off while the power consumption is thus reduced. Therefore, the Zerox signal is always in a High state (a state where a zero crossing cannot be detected).

A circuit operation in a state where the Zerox signal can be detected (a second state also referred to as the operating state of the image forming apparatus), e.g., in a standby state or a state where the image forming apparatus performs printing will be described. Since the Stanby signal is in a High state while a zero crossing is detachable, the voltage Vcc from the auxiliary winding enters a High state. Since the voltage Vcc from the auxiliary winding is in a High state, electric power for driving the transistor Q1 and the zero-cross detection circuit 202 described above, is supplied.

A current flows through the resistor R6, the diode on the primary side of the photocoupler PC1, and the collector terminal of the transistor Q2, so that electric power consumed by the zero-cross detection circuit 202 increases. If the voltage Vcc from the auxiliary winding is in a High state, the high-voltage transistor Q1 is turned on. Therefore, the power consumption increases owing to the current flowing from the LIVE line via the resistor R3 and the current flowing from the NEUTRAL line via the resistor R4. While the Zerox signal can be detected in a state where a zero crossing can be detected (a second state), electric power consumed by the power supply circuit 200 increases.

Figure 3:
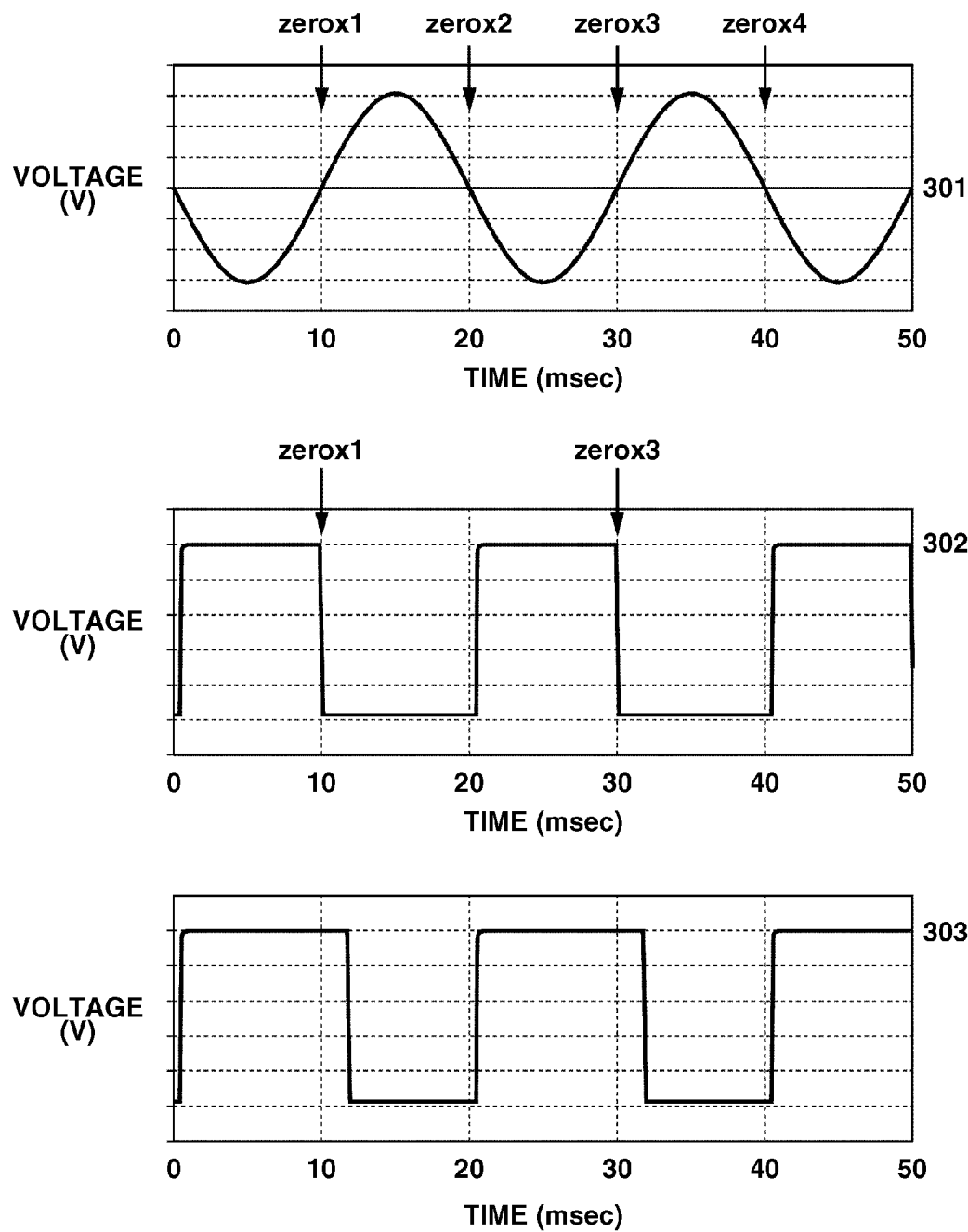
FIG. 3 illustrates the zero-cross detection circuit according to the first exemplary embodiment.

FIG. 3 is an operation waveform diagram for illustrating an effect of the Y capacitor discharge resistors R3 and R4 in the present exemplary embodiment on zero crossing detection accuracy. In FIG. 3, an inspection was performed, where the X capacitor C1=0.56 µF, the Y capacitor C3=C4=2200 µF, the X capacitor discharge resistor R1=R2=1000 kΩ, and the Y capacitor discharge resistor R3=R4=150 kΩ. A waveform 301 represents a voltage waveform (220 Vrms, 50 Hz) of the AC power supply 201. Zero-cross points Zerox1, Zerox2, Zerox3, and Zerox4 on the waveform 301 are indicated by arrows.

A waveform 302 represents a waveform of the Zerox signal in a state where the Y capacitor discharge resistor is energized (a second state). In the waveform 302, the timing of the fall of the Zerox signal matches the zero-cross points Zerox1 and Zerox 3 of the AC power supply 201. The timing of the zero-cross point Zerox4 can be detected within the CPU 203. More specifically, the CPU 203 first calculates a period from Zerox1 to Zerox3 (corresponding to one period of the AC voltage from the AC power supply 201). In the present exemplary embodiment, this period is 20 msec.

The CPU 3 predicts timing after a half period (10 msec in the present exemplary embodiment) has elapsed from the zero-cross point Zerox3, as the timing of the zero-cross point Zerox4. If one of the timing of the fall of the Zerox signal and the timing of the rise thereof is found, the zero crossings of both the rise and the fall can be detected and predicted.

A waveform 303 represents a waveform of the Zerox signal in a state where the Y capacitor discharge resistor is cut off. In the waveform 303, the timings of the fall and the rise of the Zerox signal do not match the zero crossing of the AC power supply having the waveform 301. This error occurs due to a period of time required until electric charges of the Y capacitors C3 and C4 are discharged. In a state of the waveform 303, a zero crossing detection error occurs due to a CR (time constant) delay caused by the X capacitor discharge resistors R1 and R2 and the Y capacitors C3 and C4.

In the waveform 302, the resistance values of the Y capacitor discharge resistors R3 and R4 are low. Therefore, the above-mentioned CR delay is reduced, so that zero crossing detection accuracy can be improved. A zero crossing detection error in a state of the waveform 303 differs depending on a voltage of the AC power supply 201 and a connected state to the ground GND in the external power supply unit 40. Therefore, it is difficult to accurately detect the timing of the zero crossing from the Zerox signal having the waveform 303.

Figure 4:
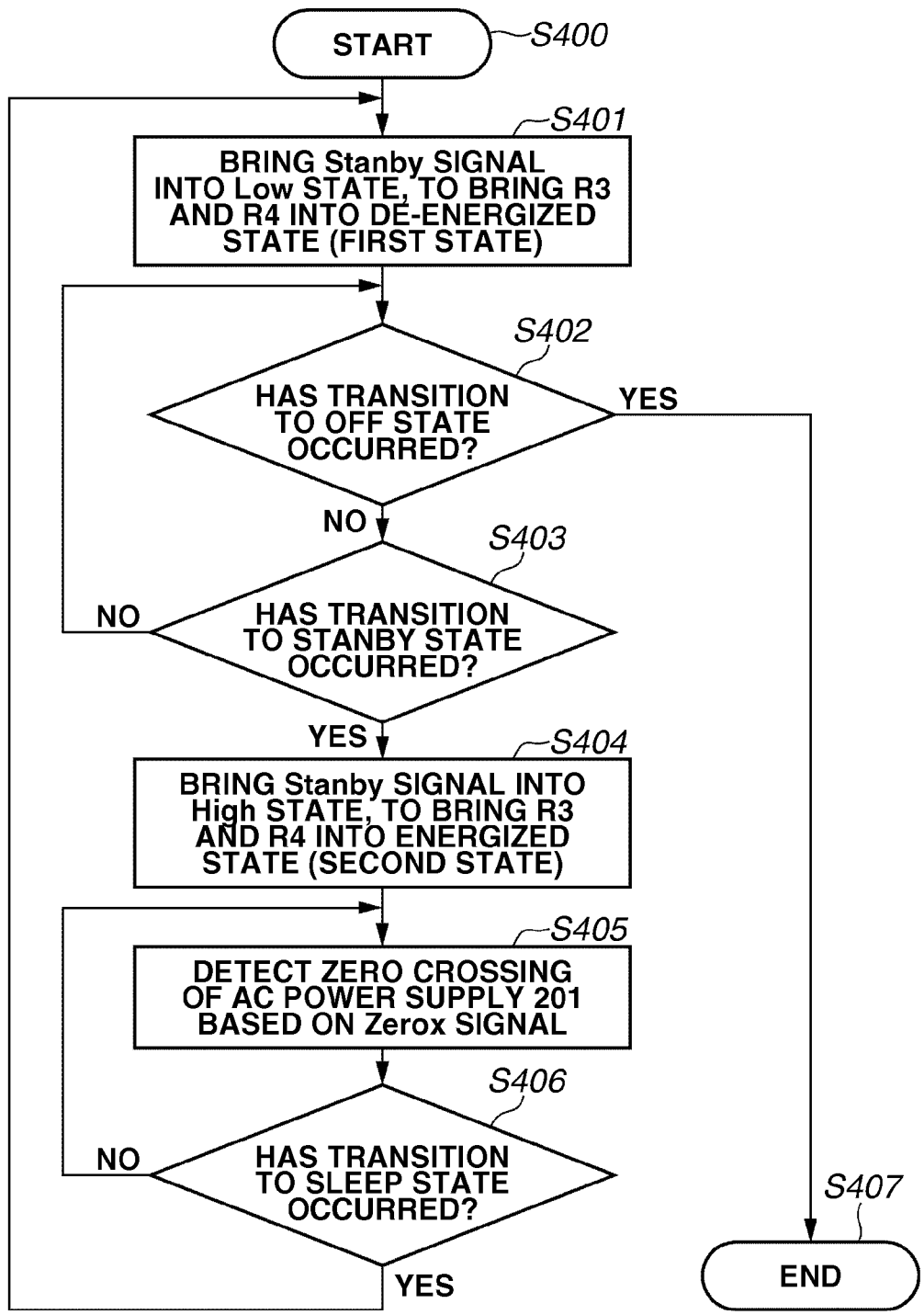
FIG. 4 illustrates a control sequence of the power supply circuit including the zero-cross detection circuit according to the first exemplary embodiment.

In the waveform 303, the period (or the frequency) of the AC power supply 201, which is represented by the waveform 301, can be detected based on the timing of the rise or the fall and the number of times thereof. FIG. 4 is a flowchart illustrating a control sequence of the power supply circuit 200 including a zero-cross detection circuit 202 by the CPU 203 in the present exemplary embodiment.

If a request to shift a power supply from an OFF state to an ON state has been issued by a power supply switch or connection of an AC power supply in step S400, the processing proceeds to step S401. In step S401, the CPU 203 brings the Stanby signal into a Low state to cut off the supply of electric power to the zero-cross detection circuit 202, and to bring the Y capacitor discharge resistors R3 and R4 into a cut-off state (a first state). The power supply circuit 200 according to the present exemplary embodiment enters a first state to reduce the power consumption in a sleep state.

In step S402, the CPU 203 determines whether a request to shift to an OFF state has been issued. If the request to shift to an OFF state has been issued (YES in step S402), the processing proceeds to step S407. In step S407, the CPU 203 ends the control. If the request to shift to an OFF state has not been issued (NO in step S402), the processing proceeds to step S403. In step S403, the CPU 203 determines whether a request to shift to a stanby state has been issued. If the request to shift to a stanby state has been issued (YES in step S403), the processing proceeds to step S404.

In step S404, the CPU 203 brings the Stanby signal into a High state to supply electric power to the zero-cross detection circuit 202 and to bring the Y capacitor discharge resistors R3 and R4 into an energized state (a second state). The power supply circuit 200 according to the present exemplary embodiment enters a second state to detect a zero crossing in the stanby state.

In step S405, the CPU 203 detects the zero crossing of the AC power supply 201 based on the timing of the fall of the Zerox signal. In the present exemplary embodiment, the timing of the fall of the Zerox signal is adjusted to match the timing of the zero crossing of the AC power supply. If the timing of the rise of the Zerox signal is adjusted to match the timing of the zero crossing of the AC power supply, the zero crossing of the AC power supply 201 may be detected based on the timing of the rise of the Zerox signal. The above-mentioned processing is repeatedly performed until the CPU 203 determines that the shift to the sleep state has occurred in step S406 to detect the zero crossing of the AC power supply 201.

Figure 12:
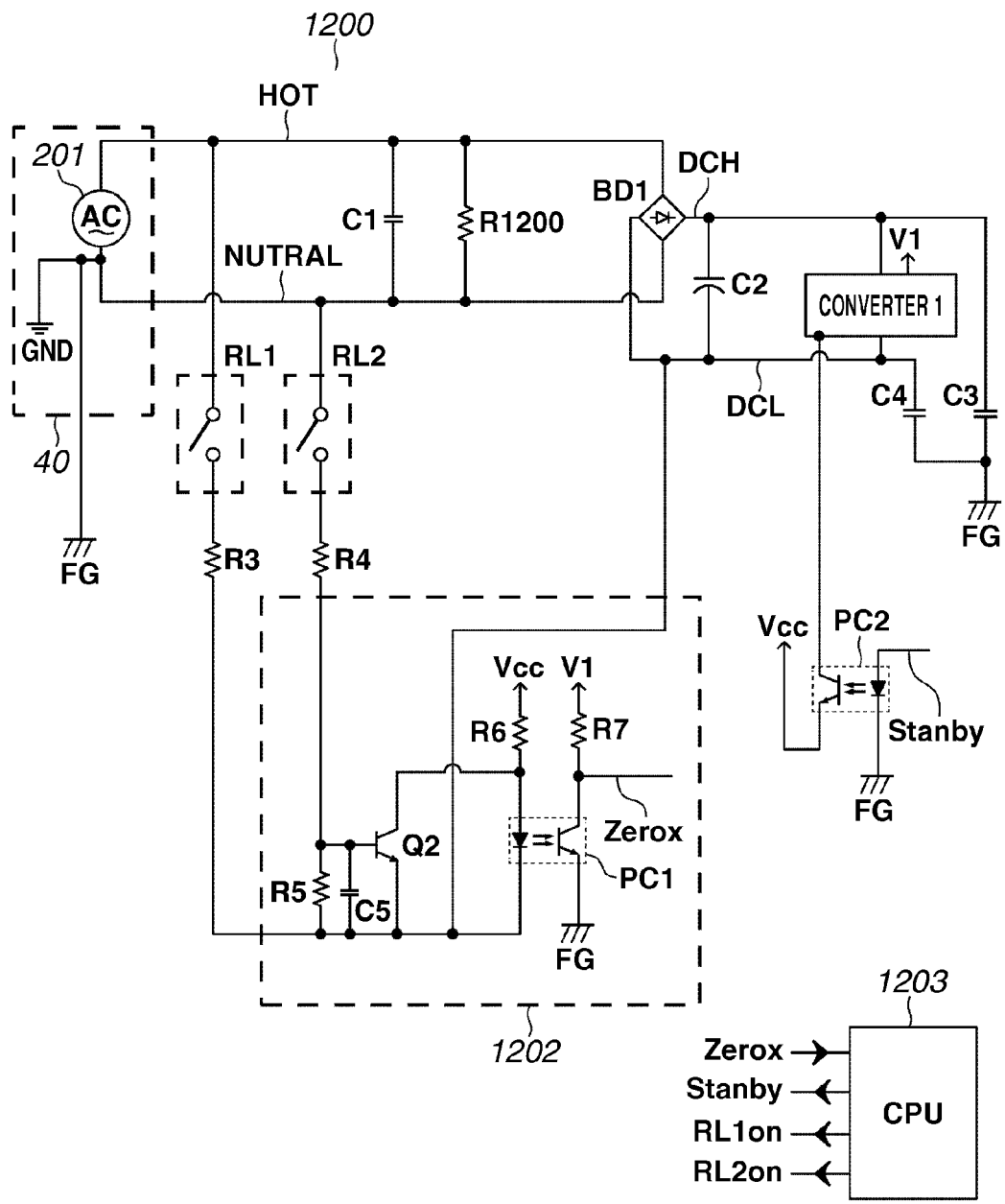
FIG. 12 illustrates a power supply circuit including a zero-cross detection circuit used as a comparative example.

The CPU 203 compares the power supply circuit 200 according to the present exemplary embodiment with a power supply circuit 1200 including a zero-cross circuit in a comparative example illustrated in FIG. 12. Description of units common to those in the power supply circuit 200 according to the present exemplary embodiment is not repeated. The power supply circuit 1200 includes an X capacitor discharge resistor R1200. If a user pulls out a power supply cable 50, an electric charge of an X capacitor C1 is discharged by an X capacitor discharge resistor R1200.

The power supply circuit 1200 includes Y capacitor discharge resistors R3 and R4. In the power supply circuit 1200 in the comparative example, a zero-cross detection circuit 1202 detects a zero crossing using a current flowing through the Y capacitor discharge resistor R4. To obtain sufficient zero crossing detection accuracy, the Y capacitor discharge resistors R3 and R4 have resistance values set lower than that of the X capacitor discharge register R1200.

In the power supply circuit 1200 in the comparative example, currents flowing through the Y capacitor discharge resistors R3 and R4 need to be cut off to reduce the power consumption similar to the power supply circuit 200 according to the present exemplary embodiment. The currents flowing through the Y capacitor discharge resistors R3 and R4 are cut off using two switches, i.e., relays RL1 and RL2. In the power supply circuit 1200 in the comparative example, an RL1on signal and an RL2on signal of a CPU 1203 are brought into a High state to operate a relay driving unit (not illustrated), so that a contact on the primary side between the relays RL1 and RL2 is brought into an ON state (an energized state).

On the other hand, in the power supply circuit 200 according to the present exemplary embodiment, the zero crossing is detected using the X capacitor discharge resistor R2 having a high resistance value, and the transistor Q1 serving as the first switch switches between an energized state and a cut-off state of the Y capacitor discharge resistors R3 and R4. Thus, an effect of reducing the power consumption is obtained by only the one transistor Q1 (the first switch) similar to a case where two switches are used in the power supply circuit 1200 in the comparative example.

If the power supply circuit 200 including the zero-cross detection circuit 202 according to the present exemplary embodiment is thus used, a state where the zero crossing can be detected and a state where the power consumption is further reduced can be switched by a simple circuit. More specifically, the zero crossing can be accurately detected in a low-cost circuit configuration, so that the power consumption in the sleep state can be further reduced.

Figure 5:
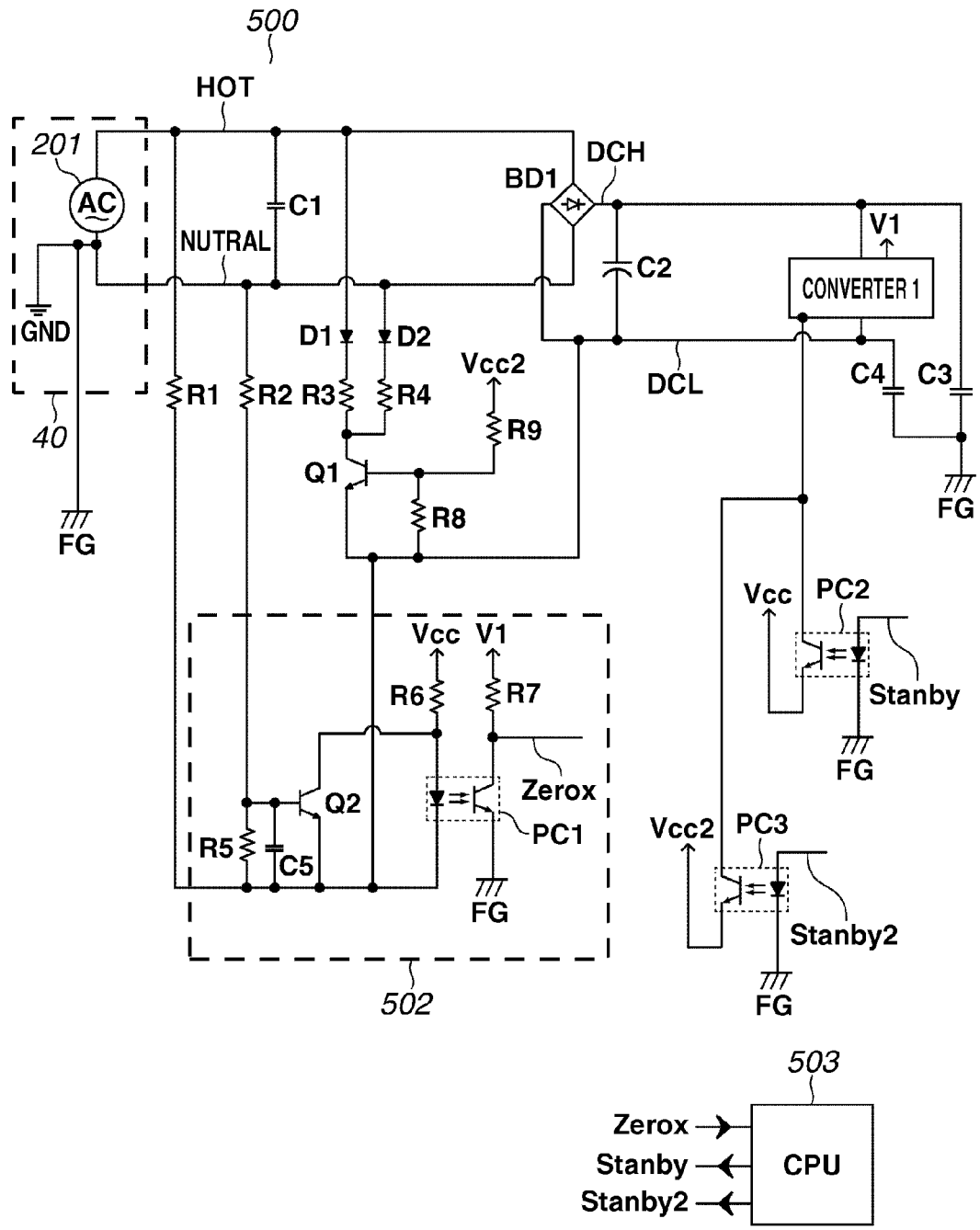
FIG. 5 illustrates a power supply circuit including a zero-cross detection circuit according to a second exemplary embodiment.

A power supply circuit according to a second exemplary embodiment illustrated in FIG. 5 is characterized in detecting a frequency to reduce power consumption (having a third state), different from the first state and the second state described in the first exemplary embodiment. A power supply circuit 500 will be described below.

The power supply circuit 500 according to the present exemplary embodiment illustrated in FIG. 5 has a Stanby signal and a Stanby2 signal. When the Stanby signal enters a High state, a voltage Vcc from an auxiliary winding enters a High state, so that electric power is supplied to a zero-cross detection circuit 502. Further, when the Stanby2 signal enters a High state, a voltage Vcc2 from the auxiliary winding enters a High state, so that a base current is supplied to a transistor Q1 (a first switch similar to that in the first exemplary embodiment), to bring Y capacitor discharge resistors R3 and R4 into an energized state.

When the Stanby signal and the Stanby2 signal are in a Low state (a first state similar to that in the first exemplary embodiment), the Y capacitor discharge resistors R3 and R4 are in a cut-off state, so that electric power consumed by the Y capacitor discharge resistors R3 and R4 can be reduced. In this state, electric power consumed in diodes on the primary side of the pull-up resistor R6, the transistor Q2, and the photocoupler PC1 in the zero-cross detection circuit 502 can be reduced.

When the Stanby signal and the Stanby2 signal are in a High state (a second state similar to that in the first exemplary embodiment), the Y capacitor discharge registers R3 and R4 are in an energized state and in a state where electric power is supplied to the zero-cross detection circuit 502. Therefore, the zero crossing of an AC power supply 201 can be detected, as indicated by the waveform 302 illustrated in FIG. 3.

When only the Stanby signal is in a High state and the Stanby2 signal is in a Low state (a third state, which characterizes the present exemplary embodiment), the Y capacitor discharge resistors R3 and R4 are in a cut-off state, so that electric power consumed by the Y capacitor discharge resistors R3 and R4 can be reduced. Further, in this state, the frequency and the period of the AC power supply 201 can be detected, as indicated by the waveform 303 illustrated in FIG. 3 as described above.

The power supply circuit 500 according to the second exemplary embodiment is characterized by having a third state where the frequency or the period of the AC power supply 201 can be detected and the power consumption can be reduced.

Figure 6:
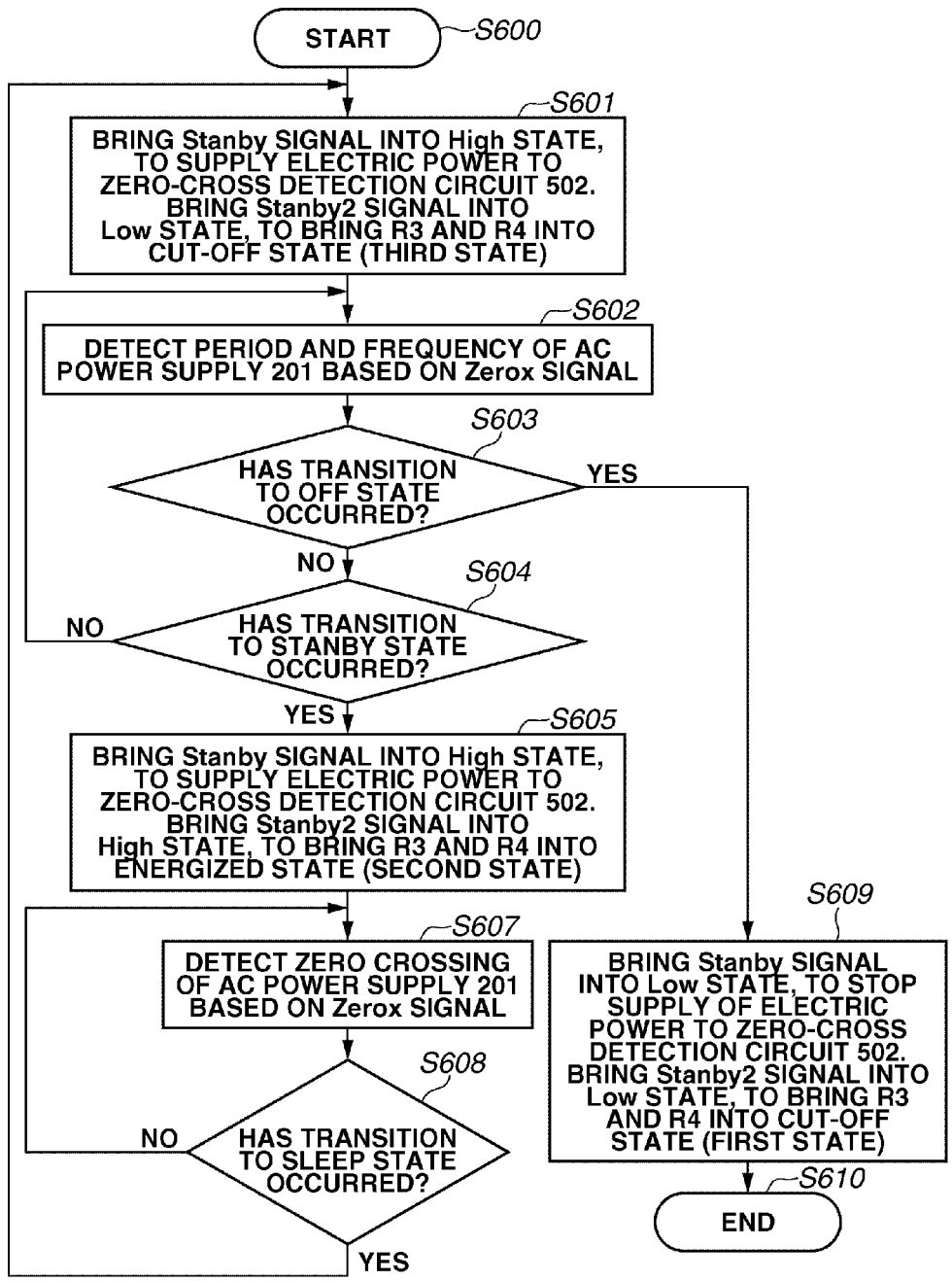
FIG. 6 illustrates a control sequence of the power supply circuit including the zero-cross detection circuit according to the second exemplary embodiment.

FIG. 6 is a flowchart illustrating a control sequence of the power supply circuit 500 including the zero-cross detection circuit 502 by a CPU 503 in the present exemplary embodiment.

In an OFF state before control starts in step S600, the CPU 503 brings the Stanby signal into a Low state to stop the supply of electric power to the zero-cross detection circuit 502, and brings the Stanby2 signal into a Low state to bring the Y capacitor discharge resistors R3 and R4 into a cut-off state (a first state). The power supply circuit 500 according to the present exemplary embodiment enters a first state to reduce the power consumption in the OFF state. If a request to shift to the state has been issued by a power supply switch or connection of the AC power supply 201 in step S600, the processing proceeds to step S601.

In step S601, the CPU 503 brings the Stanby signal into a High state to supply electric power to the zero-cross detection circuit 502, and brings the Stanby2 signal into a Low state to bring the Y capacitor discharge resistors R3 and R4 into a cut-off state (a third state). The power supply circuit 500 according to the present exemplary embodiment enters a second state to detect the frequency of the AC power supply 201 in a sleep state.

In step S602, the CPU 503 detects the frequency (period) of the AC power supply 201 based on the Zerox signal. As illustrated in FIG. 3, the frequency (period) is required to detect zero crossing. In step S602, the CPU 503 can previously detect the frequency in the third state where the power consumption can be reduced. If the Zerox signal cannot be detected, the CPU 503 can detect a state where the AC power supply 201 has broken down.

In step S603, the CPU 503 determines whether a request to shift to an OFF state has been issued. If the request to shift to an OFF state has been issued (YES in step S603), the processing proceeds to step S609. In step S609, the CPU 503 brings the Stanby signal into a Low state to stop the supply of electric power to the zero-cross detection circuit 502, and brings the Stanby2 signal into a Low state to bring the Y capacitor discharge resistors R3 and R4 into a cut-off state. After the shift to the first state has occurred, the processing proceeds to step S610. In step S610, the CPU 503 ends the control. If the request to shift to an OFF state has not been issued (NO in step S603), the processing proceeds to step S604.

In step S604, the CPU 503 determines whether a request to shift to a stanby state has been issued. If the request to shift to a stanby state has been issued (YES in step S604), the processing proceeds to step S605. In step S605, the CPU 503 brings the Stanby signal into a High state to supply electric power to the zero-cross detection circuit 502, and brings the Stanby2 signal into a High state to bring the Y capacitor discharge resistors R3 and R4 into an energized state (a second state). The power supply circuit 500 according to the present exemplary embodiment enters the second state to detect a zero crossing in the stanby state.

In step S607, the CPU 503 detects the zero crossing of the AC power supply 201 based on the timing of the fall of the Zerox signal. The above-mentioned processing is repeatedly performed until the CPU 503 determines that the shift to the sleep state has occurred in step S608 and detects the zero crossing of the AC power supply 201.

The power supply circuit 500 including the zero-cross detection circuit 502 according to the present exemplary embodiment can switch among a state where the frequency is detected while reducing the power consumption, a state where the zero crossing is detected, and a state where the power consumption is reduced with a simple circuit. Therefore, the zero crossing can be accurately detected in a low-cost circuit configuration, so that the power consumption in the sleep state can be further reduced.

Figure 7:
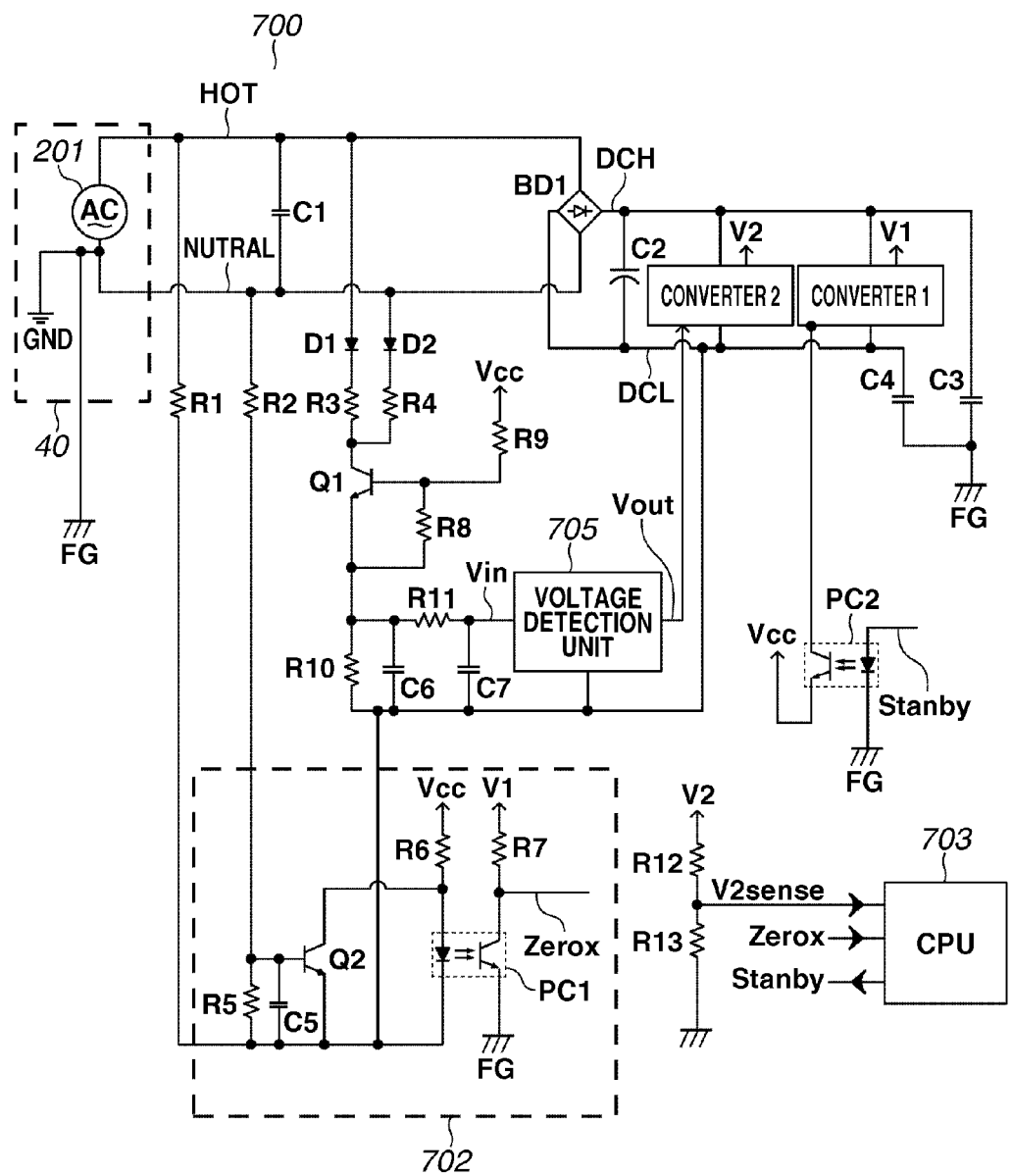
FIG. 7 illustrates a power supply circuit including a zero-cross detection circuit according to a third exemplary embodiment.

A power supply circuit 700 according to a third exemplary embodiment illustrated in FIG. 7 is characterized by including a voltage detection unit 705 configured to further detect a voltage of an AC power supply 201 using currents flowing through Y capacitor discharge resistors R3 and R4, in the power supply circuit according to the first exemplary embodiment. The power supply circuit 700 according to the third exemplary embodiment will be described below.

Description of similar components to those in the first exemplary embodiment is not repeated. In FIG. 7, the power supply circuit 700 includes a bridge diode BD1 and a capacitor C2, which full-wave rectify an input AC voltage. A first converter (converter 1) and a second converter (a converter 2) are connected to the succeeding stage. The converter 2 is an insulation type DC/DC converter, and converts a DC voltage input to the primary side, into a DC voltage V2 to be output toward the secondary side.

A capacitor C6 is charged with currents flowing through the Y capacitor discharge resistors R3 and R4. The power supply circuit 700 includes a discharge resistor R10. A voltage Vin, which has been smoothed by a resistor R11 and a capacitor C7, is input to the voltage detection unit 705. When a voltage of the AC power supply 201 falls, a charging current to the capacitor C6 decreases, and the voltage Vin input to the voltage detection unit 705 falls. The voltage detection unit 705 brings a voltage Vout into a Low state when the voltage Vin becomes a predetermined threshold voltage Vth or less, to stop an output of the converter 2.

When the output of the converter 2 is stopped and the DC voltage V2 falls, a voltage of a signal (a V2sense signal) obtained by dividing the output voltage V2 via resistors R12 and R13 falls. A CPU 703 determines that the converter 2 is stopped based on the V2sense signal.

The power supply circuit 700 according to the present exemplary embodiment is characterized by bringing a transistor Q1 (a first switch) into an OFF state to cut off currents flowing through the Y capacitor discharge resistors R3 and R4 while reducing electric power consumed by the voltage detection unit 705.

Figure 8:
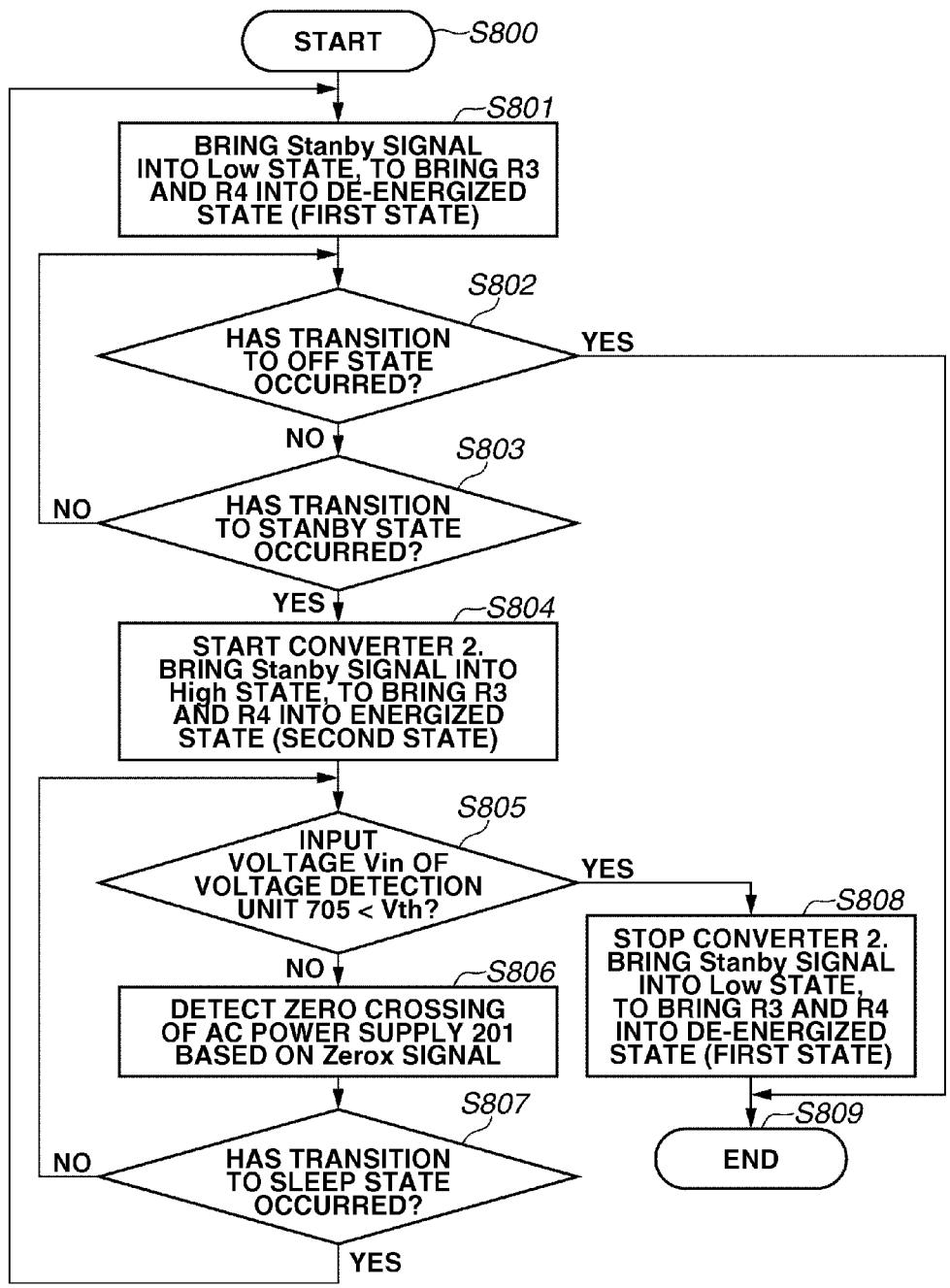
FIG. 8 illustrates a control sequence of the power supply circuit including the zero-cross detection circuit according to the third exemplary embodiment.

FIG. 8 is a flowchart illustrating a control sequence of the power supply circuit 700 by the CPU 703 in the third exemplary embodiment. If a request to shift to a power ON state has been issued by a power supply switch or by connection of the AC power supply 201 in step S800, the processing proceeds to step S801. In step S801, the CPU 703 brings a Stanby signal into a Low state to stop the supply of electric power to a zero-cross detection circuit 702, and to bring the Y capacitor discharge resistors R3 and R4 into a cut-off state (a first state).

In step S802, the CPU 703 determines whether a request to shift to a power OFF state has been issued. If the request to shift to the power OFF state has been issued (YES in step S802), the processing proceeds to step S809. In step S809, the CPU 703 ends the control. If the request to shift to a power OFF state has not been issued (NO in step S402), the processing proceeds to step S803.

In step S803, the CPU 703 determines whether a request to shift to a stanby state has been issued. If the request to shift to a stanby state has been issued (YES in step S803), the processing proceeds to step S804. In step S804, the CPU 703 brings the Stanby signal into a High state to supply electric power to the zero-cross detection circuit 702, and to bring the Y capacitor discharge resistors R3 and R4 into an energized state (a second state).

The power supply circuit 700 according to the present exemplary embodiment enters the second state to detect a zero crossing and a voltage of the AC power supply 201 in the stanby state. In the second state, a charging current flows through the capacitor C6 in the voltage detection unit 705, so that the voltage detection unit 705 can detect the voltage of the AC power supply 201.

In step S805, the CPU 703 determines whether the voltage Vin input to the voltage detection unit 705 is lower than a threshold voltage Vth. If the voltage Vin input to the voltage detection unit 705 is lower than the threshold voltage Vth (YES in step S805), the processing proceeds to step S808. In step S808, the CPU 703 stops the converter 2. When the converter 2 is stopped, the output voltage V2 falls. The CPU 703 can detect a state where the converter 2 is stopped based on the V2sense signal.

In step S808, the CPU 703 detects an abnormal state (power failure and voltage drop) of the AC power supply 201, and brings the Stanby signal into a Low state to stop the supply of electric power to the zero-cross detection circuit 702, and to bring the Y capacitor discharge resistors R3 and R4 into a cut-off state (a first state), and then the processing proceeds to step S809.

In step S809, the CPU 703 ends the control. In step S806, the CPU 703 detects the zero crossing of the AC power supply 201 based on the timing of the fall of the Zerox signal. The above-mentioned processing is repeatedly performed until the CPU 703 determines that the shift to a sleep state has occurred in step S807 to detect the zero crossing and the voltage of the AC power supply 201.

The power supply circuit 700 including the zero-cross detection circuit 702 and the voltage detection unit 705 according to the present exemplary embodiment can thus switch between a state where the zero crossing and the voltage of the AC power supply 201 are detected and a state where the power consumption can be reduced with a simple circuit. Therefore, the zero crossing can be accurately detected in a low-cost circuit configuration, so that the power consumption in the sleep state can be further reduced.

Figure 9:
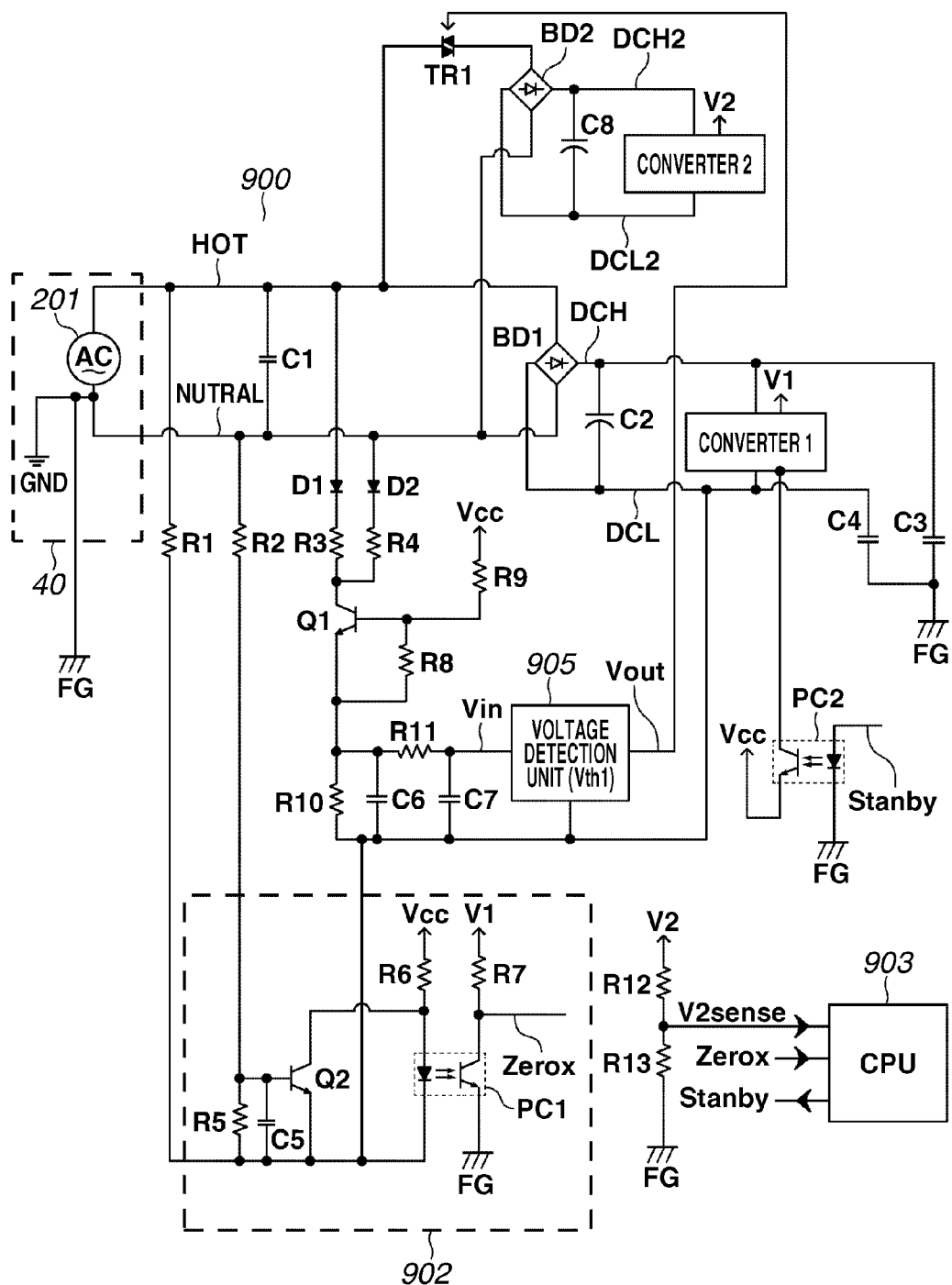
FIG. 9 illustrates a power supply circuit including a zero-cross detection circuit according to a fourth exemplary embodiment.

A power supply circuit 900 according to a fourth exemplary embodiment illustrated in FIG. 9 is characterized by including a voltage detection unit 905 similar to the third exemplary embodiment. The power supply circuit 900 according to the present exemplary embodiment will be described below.

Description of similar components to those in the third exemplary embodiment is not repeated. In FIG. 9, the power supply circuit 900 includes a bridge diode BD1 and a capacitor C2, which full-wave rectify an input AC voltage. A converter 1 is connected to the succeeding stage. The power supply circuit 900 includes a bridge diode BD2 and a capacitor C8, which full-wave rectify an input AC voltage. A converter 2 is connected to the succeeding stage.

While a voltage obtained by full-wave rectifying the AC voltage is supplied to the converter 2 in the present exemplary embodiment, a voltage obtained by voltage-doubler rectifying the AC voltage instead of full-wave rectifying may be supplied to the converter 2. As to the supply of electric power to the converter 2, a triac TR1 serving as a second switch switches between a power supply state and a cutoff state. A control circuit (not illustrated) controls an operation of the triac TR1. The converter 2 is an insulation type DC/DC converter, and converts a DC voltage input from the primary side, to output a DC voltage V2 toward the secondary side.

The voltage detection unit 905 according to the present exemplary embodiment will be described below. A capacitor C6 is charged with currents flowing through Y capacitor discharge resistors R3 and R4. The power supply circuit 900 includes a discharge resistor R10. A voltage Vin, which has been smoothed by a resistor R11 and a capacitor C7, is input to the voltage detection unit 905. The voltage detection unit 905 brings a voltage Vout into a High state when the voltage Vin becomes a predetermined threshold voltage Vth2 or more, and brings the triac TR1 into a cut-off state to stop an output of the converter 2.

In the fourth exemplary embodiment, the converter 1 and the capacitor C2 are universally configured such that an AC power supply 201 is operable even when AC voltages in different voltage ranges such as 100 V system (100 V to 127 V) and 200 V system (220 V to 240 C) are input. The capacitor C8 and the converter 2 correspond to only an AC power supply in 100 V system. The capacitor C8 and the converter 2 may break down when erroneously connected to an AC power supply in 200 V system if measures to prevent the break-down are not taken.

In the power supply circuit 900 according to the present exemplary embodiment, when a voltage of the AC power supply 201 becomes high, a charging current flowing to the capacitor C6 increases, and the voltage Vin input to the voltage detection unit 905 rises. If the voltage Vin input to the voltage detection unit 905 becomes Vth2 or more, the triac TR1 is brought into a cut-off state, so that a higher voltage than a specification range can be prevented from being applied to the capacitor C8 and the converter 2.

When the triac TR1 is brought into a cut-off state, the supply of electric power to the converter 2 is stopped. When the output voltage V2 falls, a voltage of a V2sense signal obtained by dividing the output voltage V2 via resistors R12 and R13 falls. A CPU 903 determines a state where an output of the converter 2 is stopped in response to the V2sense signal.

As described above, the power supply circuit 900 according to the fourth exemplary embodiment is characterized by the voltage detection unit 905. A transistor Q1 serving as a first switch is turned off, so that currents flowing through the Y capacitor discharge resistors R3 and R4 can be cut off while electric power consumed by the voltage detection unit 905 can also be reduced. More specifically, the voltage detection unit 905 detects a voltage using the current flowing through the Y capacitor discharge resistors R3 and R4.

Figure 10:
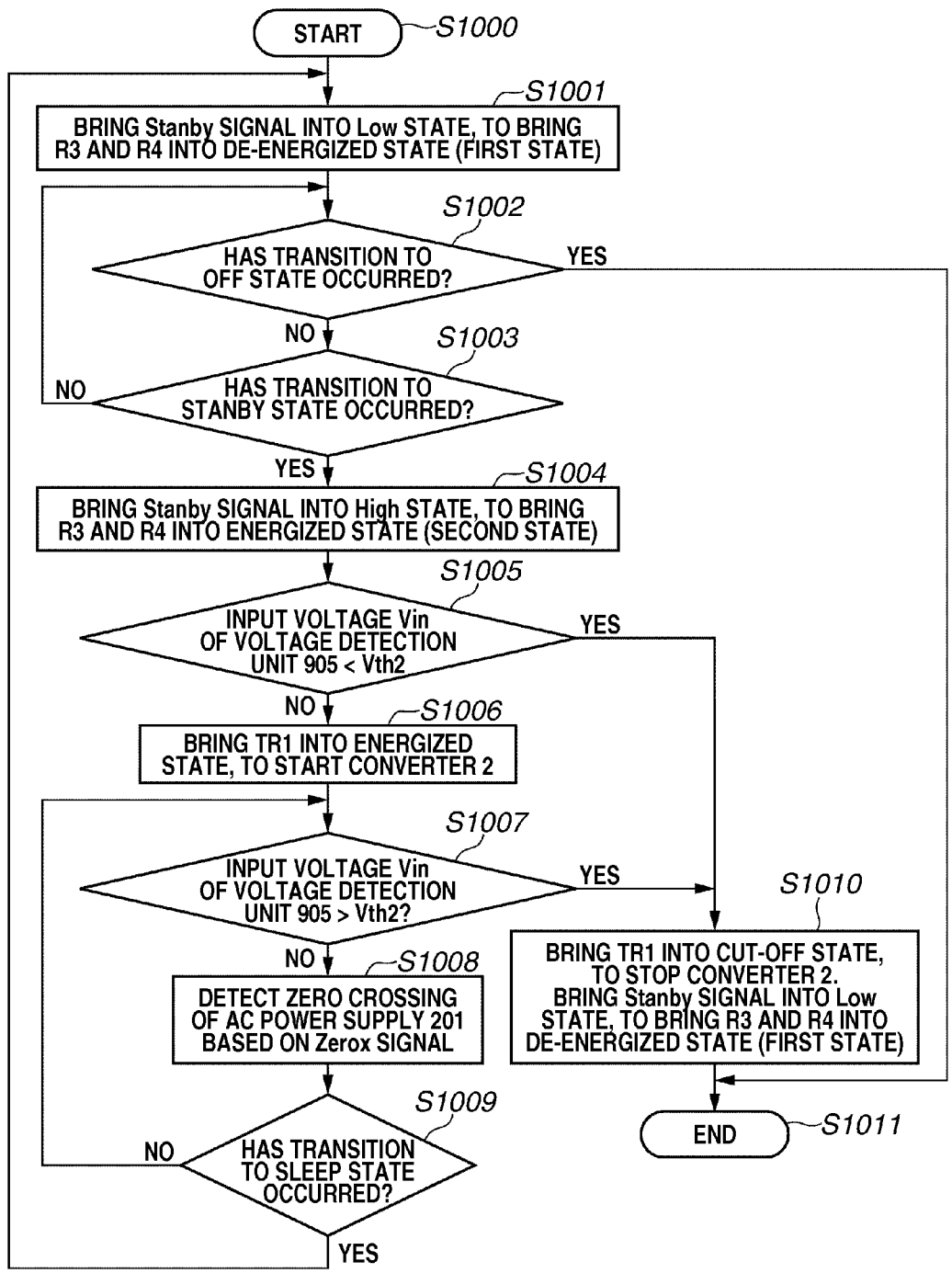
FIG. 10 illustrates a control sequence of the power supply circuit including the zero-cross detection circuit according to the fourth exemplary embodiment.

FIG. 10 is a flowchart illustrating a control sequence of the power supply circuit 900. If a request to shift to a power ON state has been issued by a power supply switch or by connection of the AC power supply 201 in step S1000, the processing proceeds to step S1001. In step S1001, the CPU 903 brings the Stanby signal into a Low state to stop the supply of electric power to a zero-cross detection circuit 902, and to bring the Y capacitor discharge resistors R3 and R4 into a cut-off state (a first state). The power supply circuit 900 according to the present exemplary embodiment enters a first state to reduce power consumption in a sleep state and a power OFF state.

In step S1002, the CPU 903 determines whether a request to shift to a power OFF state has been issued. If the request to shift to a power OFF state has been issued (YES in step S1002), the processing proceeds to step S1011. In step S1011, the CPU 903 ends the control.

In step S1003, the CPU 903 determines whether a request to shift to a stanby state has been issued. If the request to shift to a stanby state has been issued (YES in step S1003), the processing proceeds to step S1004. In step S1004, the CPU 903 brings the Stanby signal into a High state to supply electric power to the zero-cross detection circuit 902, and to bring the Y capacitor discharge resistors R3 and R4 into an energized state (a second state). The power supply circuit 900 according to the present exemplary embodiment enters the second state to detect a zero crossing and a voltage of the AC power supply 201 in the standby state.

In the second state, a charging current flows through the capacitor C6 in the voltage detection unit 905, so that the voltage detection unit 905 can detect the voltage of the AC power supply 201. In step S1005, the CPU 903 determines whether the voltage Vin input to the voltage detection unit 905 is higher than a threshold voltage Vth2. If the voltage Vin input to the voltage detection unit 905 is higher than the threshold voltage Vth2 (YES in step S1005), the processing proceeds to step S1010. In step S1010, the CPU 903 brings the triac TR1 into a cut-off state.

When the output voltage V2 of the converter 2 falls, a state where the converter 2 is stopped can be detected based on the V2sense signal. In step S1010, the CPU 903 brings the Stanby signal into a Low state to stop the supply of electric power to the zero-cross detection circuit 902, and to bring the Y capacitor discharge resistors R3 and R4 into a cut-off state (a first state), and then the processing proceeds to step S1011. In step S1011, the CPU 903 ends the control.

In the first state, the triac TR1 can cut off a voltage to be applied to the capacitor C7 and the converter 2. Accordingly, the triac TR1 functions as a protection circuit if a voltage that is higher than a specification is applied from the AC power supply 201. In step S1006, the CPU 903 brings the triac TR1 into an energized state to start the converter 2.

In step S1007, the CPU 903 causes the voltage detection unit 905 to detect a voltage of the AC power supply 201 and determines whether the voltage Vin input to the voltage detection unit 905 is higher than a threshold voltage Vth2. If the voltage Vin input to the voltage detection unit 905 becomes higher than the threshold voltage Vth2 (YES in step S1007), the processing proceeds to step S1010, as described above.

In step S1008, the CPU 903 detects the zero crossing of the AC power supply 201 based on the timing of the fall of the Zerox signal. The above-mentioned processing is repeatedly performed until the CPU 903 determines that the shift to the sleep state has occurred in step S1009 to detect the zero crossing and the voltage of the AC power supply 201.

The power supply circuit 900 including the zero-cross detection circuit 902 and the voltage detection unit 905 according to the present exemplary embodiment can thus switch between a state where the zero crossing and the voltage of the AC power supply 201 are detected and a state where the power consumption can be reduced with a simple circuit. Therefore, the zero crossing can be accurately detected in a low-cost circuit configuration, so that the power consumption in the sleep state can be further reduced.

<Modified Example of Power Supply Circuit According to First Exemplary Embodiment>

Figure 11:
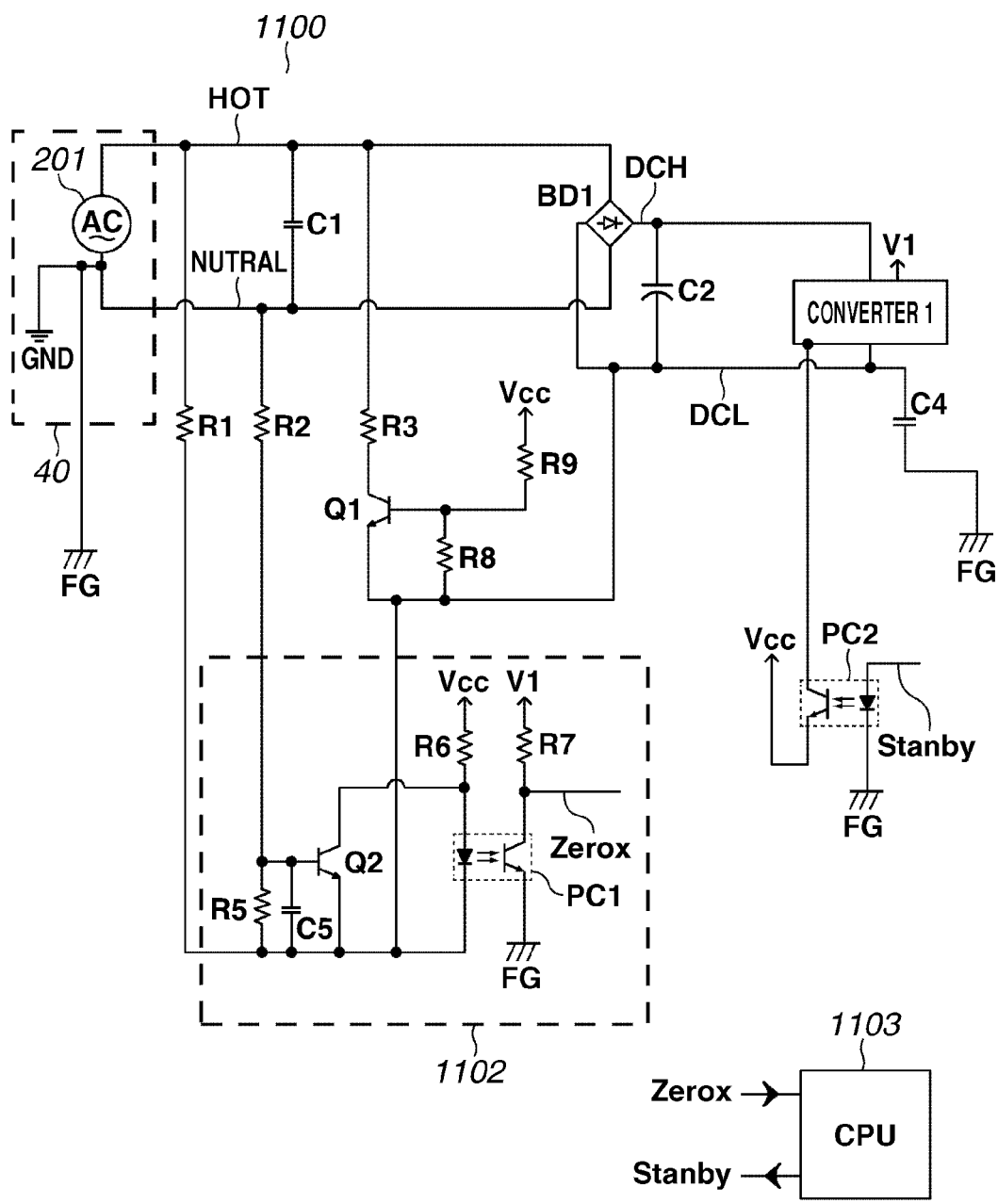
FIG. 11 illustrates a power supply circuit including a zero-cross detection circuit in a first modified example of the first exemplary embodiment.

A modified example of the power supply circuit 200 according to the first exemplary embodiment will be described below. As a first modified example, a power supply circuit 1100 illustrated in FIG. 11 will be described. Description of similar components to those in the first exemplary embodiment is not repeated. FIG. 11 illustrates a configuration in which the power supply circuit 1100 includes only a Y capacitor discharge resistor R3 and only a Y capacitor C4, and a NEUTRAL line is connected to a ground GND in an external power supply unit 40. A connection of the ground GND in the external power supply unit 40 and a connection of the Y capacitor C4 allow only limited configurations, according to the present example. However, even when the power supply circuit 1100 includes either one of two Y capacitor discharge resistors R3 and R4 described in the power supply circuit 200, a zero crossing of an AC power supply 201 can be detected. The power supply circuit 1100 can switch between a state where a zero crossing can be detected and a state where power consumption can be reduced, as a smaller circuit than the power supply circuit 200.

Figure 13:
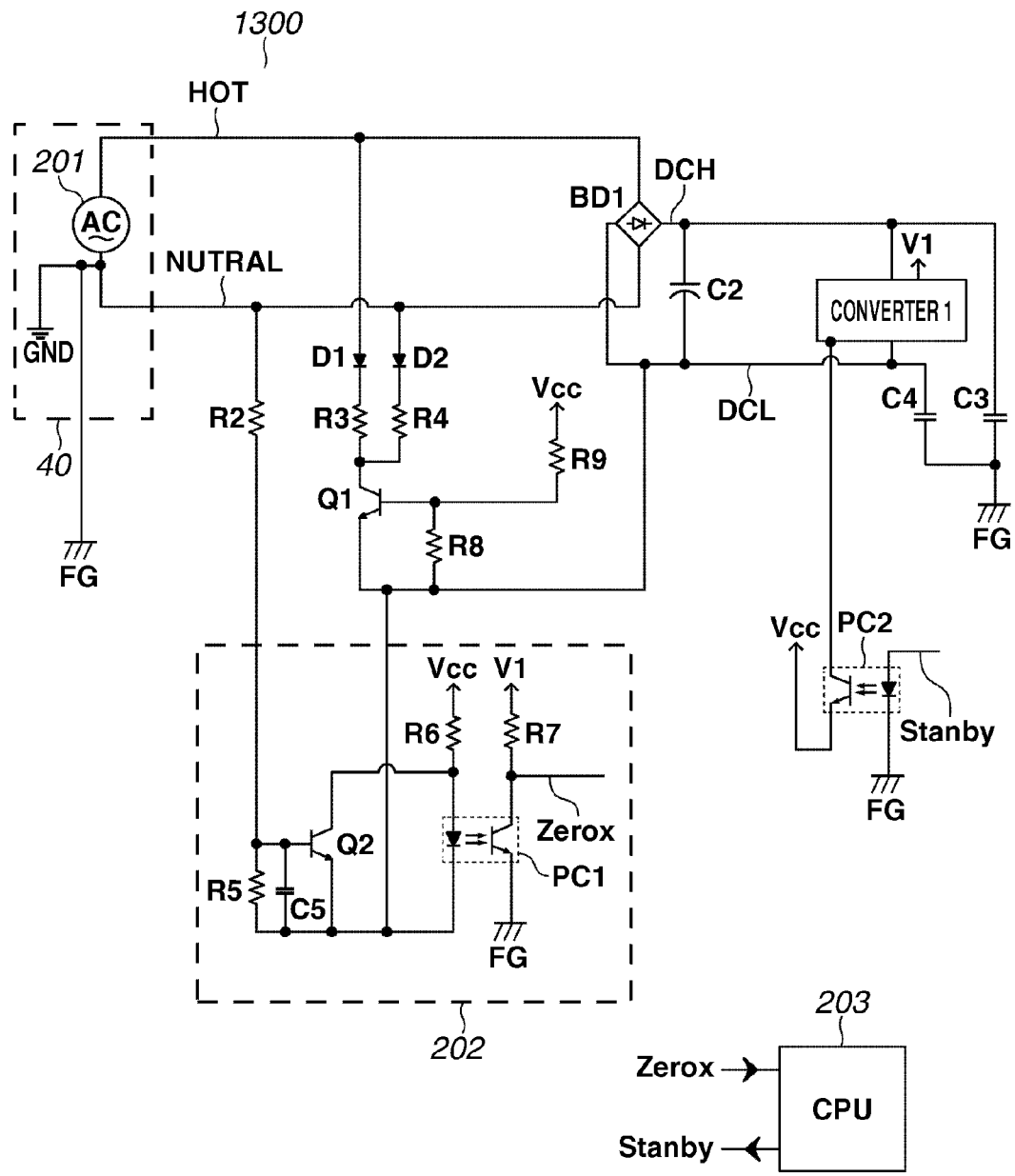
FIG. 13 illustrates a power supply circuit including a zero-cross detection circuit in a second modified example of the first exemplary embodiment.

As a second modified example, a power supply circuit 1300 illustrated in FIG. 13 will be described below. Description of similar components to those in the first exemplary embodiment is not repeated. The power supply circuit 1300 illustrated in FIG. 13 does not include an X capacitor, or includes an X capacitor having a small capacitance value, so that the X capacitor need not be discharged when a power supply cable 50 is pulled out. As described above, discharge resistors for discharging Y capacitors C3 and C4 are required to detect a zero crossing with high accuracy, as described above.

A zero-cross detection resistor R2 has also a function of discharging electric charges of the Y capacitors C3 and C4. However, respective resistance values of the discharge resistors are not sufficiently low for capacitances of the Y capacitors C3 and C4. Therefore, zero-cross detection accuracy decreases due to CR (time constant) delay. In this modified example, the Y capacitor discharge resistors R3 and R4 have resistance values lower than that of the zero-cross detection resistor R2.

Resistance value of zero-cross detection resistor R2>resistance value of Y capacitor discharge resistor R3

Resistance value of zero-cross detection resistor R2>resistance value of Y capacitor discharge resistor R4

Even in a configuration in which an X capacitor need not be discharged, such as the power supply circuit 1300, electric power consumed by the zero-cross detection resistor R2 in the zero-cross detection circuit 202 can also be reduced by providing the Y capacitor discharge resistors R3 and R4, separately from the zero-cross detection resistor R2. Further, a first switch Q1 is provided which can switch between a state where a zero crossing can be detected and a state where power consumption can be reduced.

As a third modified example, a power supply circuit 1400 illustrated in FIG. 14 will be described below. Description of similar components to those in the first exemplary embodiment is not repeated.

Figure 14:
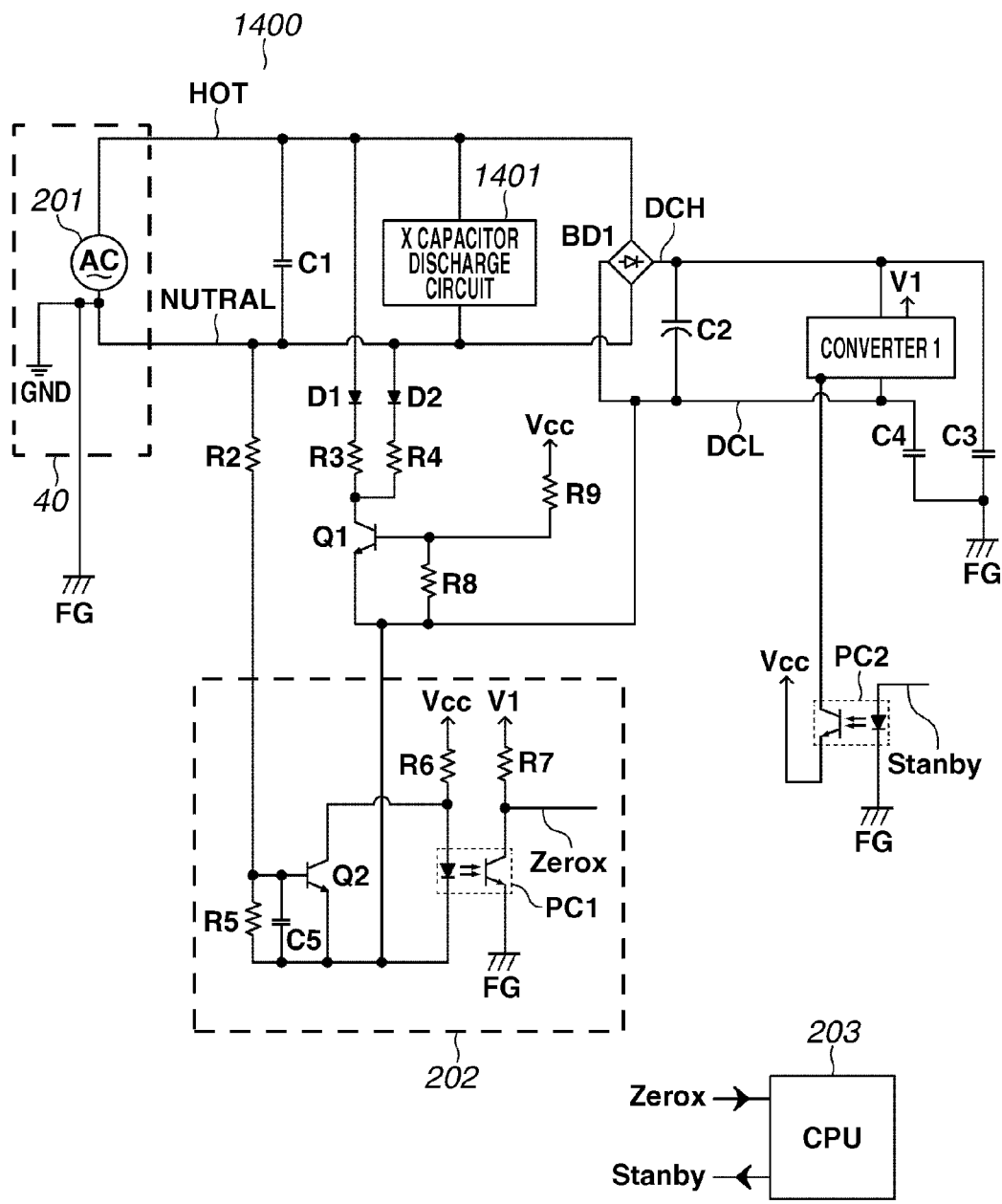
FIG. 14 illustrates a power supply circuit including a zero-cross detection circuit in a third modified example of the first exemplary embodiment.

The power supply circuit 1400 illustrated in FIG. 14 includes an X capacitor discharge circuit 1401 for detecting a state where a power supply cable 50 falls out, to discharge an X capacitor C1. The X capacitor discharge circuit 1401 detects a voltage of an AC power supply 201, and discharges the X capacitor C1 when an AC voltage cannot be detected. While the AC voltage is detected, a resistance value of the X capacitor discharge circuit 1401 is high, so that power consumption can be reduced. If the AC voltage cannot be detected, for example, if the power supply cable 50 is pulled out, the X capacitor C1 can be discharged at a low resistance.

Also in a configuration in which an X capacitor discharge circuit 1401 is provided such as the power supply circuit 1400, electric power consumed by the zero-cross detection resistor R2 for a zero-cross detection circuit 202 can be reduced by providing Y capacitor discharge resistors R3 and R4, separately from a zero-cross detection resistor R2. Further, a first switch Q1 is provided which can switch between a state where a zero crossing can be detected and a state where power consumption can be reduced.

Also by the above-mentioned power supply circuits described in the first, second, and third modified examples, the zero crossing can be accurately detected in a low-cost circuit configuration, so that the power consumption in the sleep state can be further reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-271681 filed Dec. 12, 2011, which is hereby incorporated by reference herein in its entirety.

What is claimed is:

1. A power supply comprising:
   a first capacitor provided between lines to which an AC voltage is input from an AC power supply;
   a zero-cross detection resistor for discharging an electric charge of the first capacitor and for detecting zero crossing of the AC voltage input from the AC power supply;
   a zero-cross detection unit configured to detect the timing of the zero crossing of the AC voltage input from the AC power supply based on a detection signal from the zero-cross detection resistor;
   a second capacitor provided between a line to which a voltage obtained by full-wave rectifying the AC voltage that is input from the AC power supply is output, and a frame ground of an image forming apparatus;
   a discharge resistor having a resistance value smaller than the zero-cross detection resistor and configured to discharge an electric charge of the second capacitor; and
   a first switch configured to switch between a first state where a current to the discharge resistor is cut off and a second state where a current flows through the discharge resistor.

2. The power supply according to claim 1, further having a third state where the current to the discharge resistor is cut off by the first switch, and electric power to be supplied to the zero-cross detection unit is supplied.

3. The power supply according to claim 1, further comprising
a voltage detection unit configured to detect that the AC voltage input from the AC power supply has fallen using the current flowing through the discharge resistor.

4. The power supply according to claim 3, further comprising
a first converter configured to convert the voltage obtained by full-wave rectifying the AC voltage that is input from the AC power supply,
wherein the first converter is stopped when the voltage detection unit detects that the voltage has fallen.

5. The power supply according to claim 3, further comprising
a second switch, and
a second converter configured to convert a voltage obtained by full-wave rectifying or voltage-doubler rectifying the AC voltage that is input from the AC power supply in the succeeding stage of the second switch,
wherein the second converter is stopped by the second switch when the voltage detection unit detects that the voltage has become higher than a threshold value.

6. An image forming apparatus configured to form an image on a recording material and including a fixing unit configured to fix the image formed on the recording material, comprising:
a power supply including a first capacitor provided between lines to which an AC voltage is input from an AC power supply, a zero-cross detection resistor for discharging an electric charge of the first capacitor and for detecting a zero crossing of the AC voltage input from the AC power supply, a zero-cross detection unit configured to detect the timing of zero crossing of the AC voltage input from the AC power supply based on a detection signal from the zero-cross detection resistor, a second capacitor provided between a line to which a voltage obtained by full-wave rectifying the AC voltage that is input from the AC power supply is output, and a frame ground of the image forming apparatus, a discharge resistor having a resistance value smaller than the zero-cross detection resistor and configured to discharge an electric charge of the second capacitor, and a first switch configured to switch between a first state where a current to the discharge resistor is cut off and a second state where a current flows through the discharge resistor;
an electric power supply switch for supplying electric power to the fixing unit; and
an electric power control unit configured to control the electric power supplied to the fixing unit by controlling an operation of the electric power supply switch,
wherein the electric power control unit controls an operation of the electric power supply switch according to a detection result of the zero-cross detection unit.

7. The image forming apparatus according to claim 6, further having a third state where the current to the discharge resistor is cut off using the first switch, and electric power to be supplied to the zero-cross detection unit is supplied.

8. The image forming apparatus according to claim 6, further comprising
a voltage detection unit configured to detect that the AC voltage input from the AC power supply has fallen using the current flowing through the discharge resistor.

9. The image forming apparatus according to claim 8, further comprising
a first converter configured to convert the voltage obtained by full-wave rectifying the AC voltage that is input from the AC power supply,
wherein the first converter is stopped when the voltage detection unit detects that the voltage has fallen.

10. The image forming apparatus according to claim 8, further comprising
a second switch, and
a second converter configured to convert a voltage obtained by full-wave rectifying or voltage-doubler rectifying the AC voltage that is input from the AC power supply, in the succeeding stage of the second switch,
wherein the second converter is stopped by the second switch when the voltage detection unit detects that the voltage has become higher than a threshold value.

* * * * *